United States Patent [19]

Johnsson

[11] 4,432,304
[45] Feb. 21, 1984

[54] FEED STUFF ADMINISTRATION DEVICE FOR MINKS

[76] Inventor: Bengt D. Johnsson, Fremmenaryd Pl. 2359, S-280 60 Broby, Sweden

[21] Appl. No.: 436,723

[22] Filed: Oct. 26, 1982

Related U.S. Application Data

[63] Continuation of Ser. No. 254,260, Apr. 15, 1981, abandoned.

[30] Foreign Application Priority Data

Apr. 18, 1980 [SE] Sweden .............................. 8002914

[51] Int. Cl.³ .................................................. A01K 5/00
[52] U.S. Cl. ..................................... 119/18; 119/52 R
[58] Field of Search ..................... 119/52 R, 61, 54, 18

[56] References Cited

U.S. PATENT DOCUMENTS

| | | | |
|---|---|---|---|
| 1,004,328 | 9/1911 | Wilson | 119/54 |
| 1,595,758 | 5/1922 | Collins | 119/54 |
| 1,599,215 | 8/1926 | Crook | 119/54 |
| 2,122,591 | 12/1936 | Smrekar, Sr. | 119/61 |
| 2,607,318 | 8/1953 | Collier et al. | 119/53 |
| 2,746,423 | 8/1953 | Runion | 119/52 R |

FOREIGN PATENT DOCUMENTS

| | | |
|---|---|---|
| 2161439 | 12/1971 | Fed. Rep. of Germany . |
| 140221 | 2/1977 | Norway . |
| 7311187 | 4/1973 | Sweden . |
| 1482339 | 11/1975 | United Kingdom . |

Primary Examiner—Hugh R. Chamblee
Attorney, Agent, or Firm—Brumbaugh, Graves, Donohue & Raymond

[57] ABSTRACT

The present invention relates to a feeding device for mink for the distribution of dry feed stuff, whereby the device is intended to prevent the mink from routing out the feed stuff by scratching from the device. Hereby the device comprises a container part (1) and a bowl shaped part (2) from which the mink eats the feed stuff, whereby the bowl shaped part (2) is provided with a horizontally arranged, open bow (6) in the feed stuff surface or at some distance above the feed stuff surface, and whereby the bowl shaped part is provided with horizontally edges (3) extending in over the feed stuff (FIG. 4).

4 Claims, 4 Drawing Figures

FEED STUFF ADMINISTRATION DEVICE FOR MINKS

This is a continuation of application Ser. No. 254,260, filed Apr. 15, 1981, now abandoned.

DESCRIPTION

1. TECHNICAL FIELD

The present invention relates to a device for administering feed stuff to minks and in particular dry feed stuff in the cage of the mink.

An object of the present invention is thereby to obtain such a feed stuff administering device that the mink is prevented from routing out the feed stuff preferably being present in the form of pellets or granules, by scratching it out of the device and out through the bottom of the cage.

A further object is to obtain a feed stuff device which can be applied in the cage of the mink without any need for tearing the cage net apart.

2. BACKGROUND OF THE INVENTION

It is previously known feeding devices for mink, which devices are intended for the distribution of dry feed stuff in the form of pellets. The distribution devices thereby mainly comprise a containerpart, which is a reservoir for the feed stuff and a distribution part, from which the mink eats the feed stuff. That is to say that the latter is a feed bowl for the mink.

It has, however, turned out that previously used devices have a number of drawbacks in that the mink has been able to very easily rout out the feed stuff by scratching it out of the feed bowl, whereby the feed stuff falls through the bottom of the mink cage and down to the underlying ground. This means on one hand an economical loss in that more feed stuff than necessary is used, and on the other hand a sanitary problem as rats and birds are called to the mink farm and there can cause diseases in the stock.

Certain proposals to design a routing out inhibiting tongue between the reservoir and the feed bowl have been given, but it has been shown that in spite of that the mink has succeeded in routing out large amounts of feed stuff.

Known feed stuff devices have also had the drawback of being intended to be inserted with their feed bowl through a hole arranged in the cage net. This means that the cage net is damaged and that certain means must be applied when the device is removed from the cage in order to prevent the mink from running out. Each animal that succeeds in escaping is a great cost to the mink farmer and may furthermore mean that a far going breeding programme must be interrupted completely or partly.

DISCLOSURE OF THE PRESENT INVENTION

Above mentioned drawbacks have now surprisingly been eliminated by the present invention, which is characterized in that an open bow means is arranged substantially horisontally in the bowl shaped part, whereby the bow means is arranged in or at some distance above the surface of a feed stuff flowing forward from the container.

A preferred embodiment is characterized in that the bowl shaped part is provided with horisontally, in over the feed stuff extending edges, whereby the width of the edges is invertedly proportional against the depth to the surface of the feed stuff, which edges restrict the free opening of the bowl shaped part upwardly.

Another preferred embodiment is characterized in that the bow seen from above includes substantially the same surface as the free opening of the bowl shaped part.

BEST MODE OF CARRYING OUT THE INVENTION

In the following the invention will be described more in detail with reference to the attached drawing, wherein FIG. 1 shows a cross-section of the feeding device seen from the side, FIG. 2 shows the device seen from above.

Figure 1:
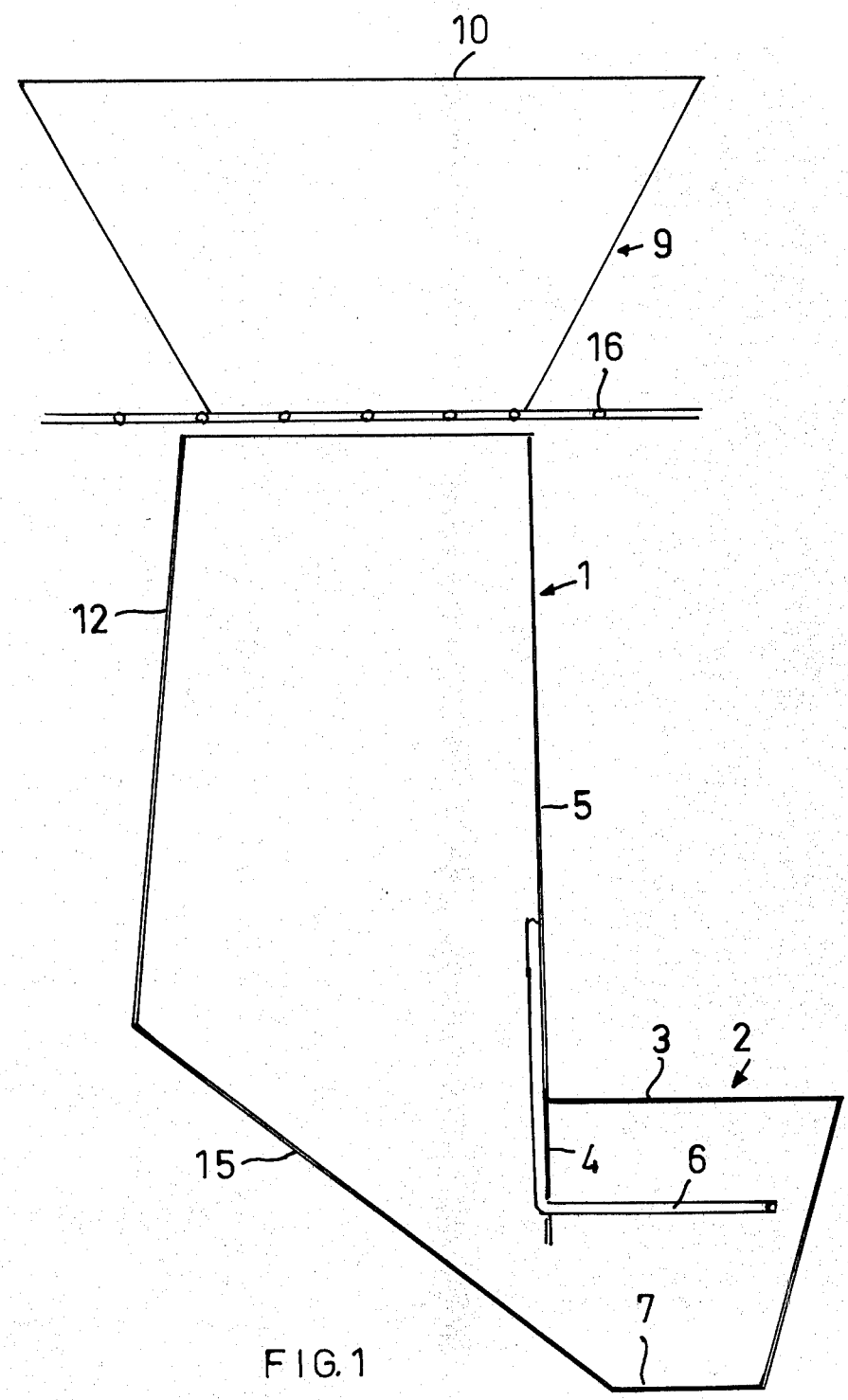
Figure 2:
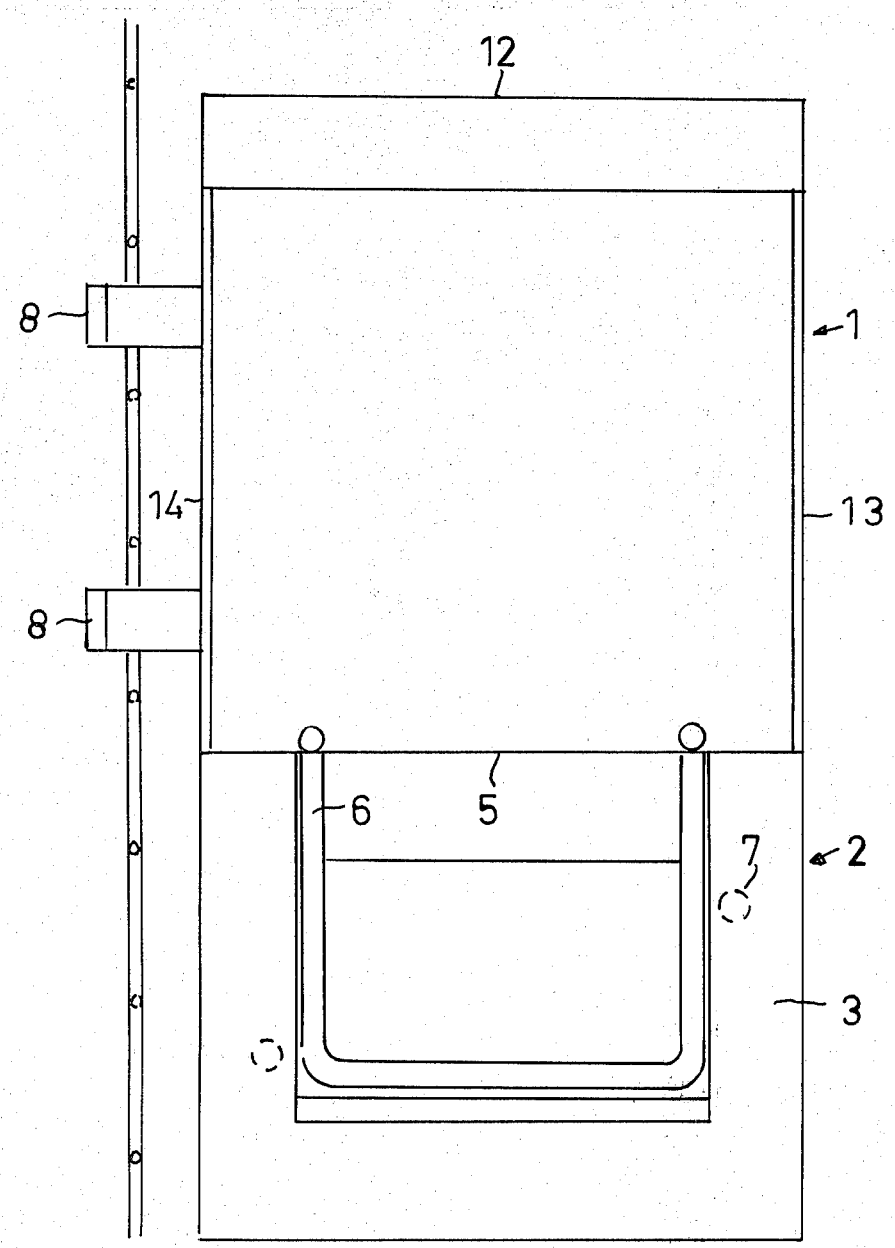
Figure 3:
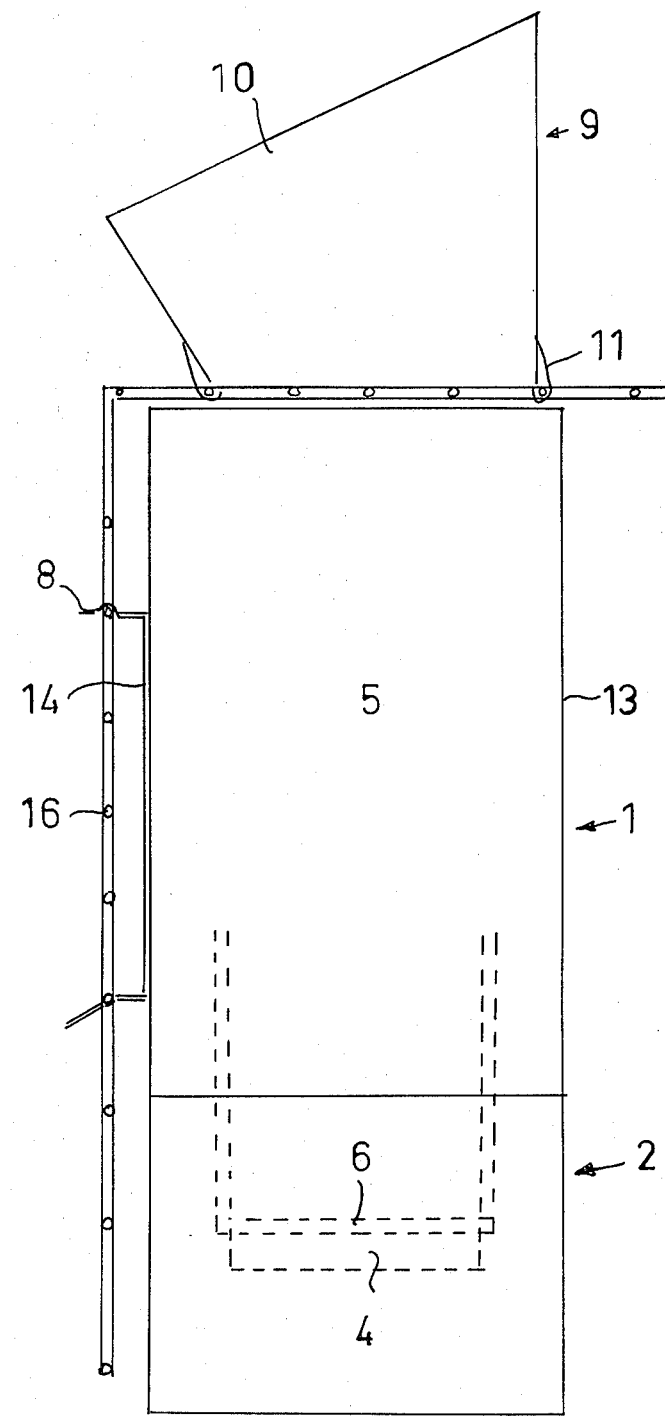
FIG. 3 shows the device seen from the front side.
Figure 4:
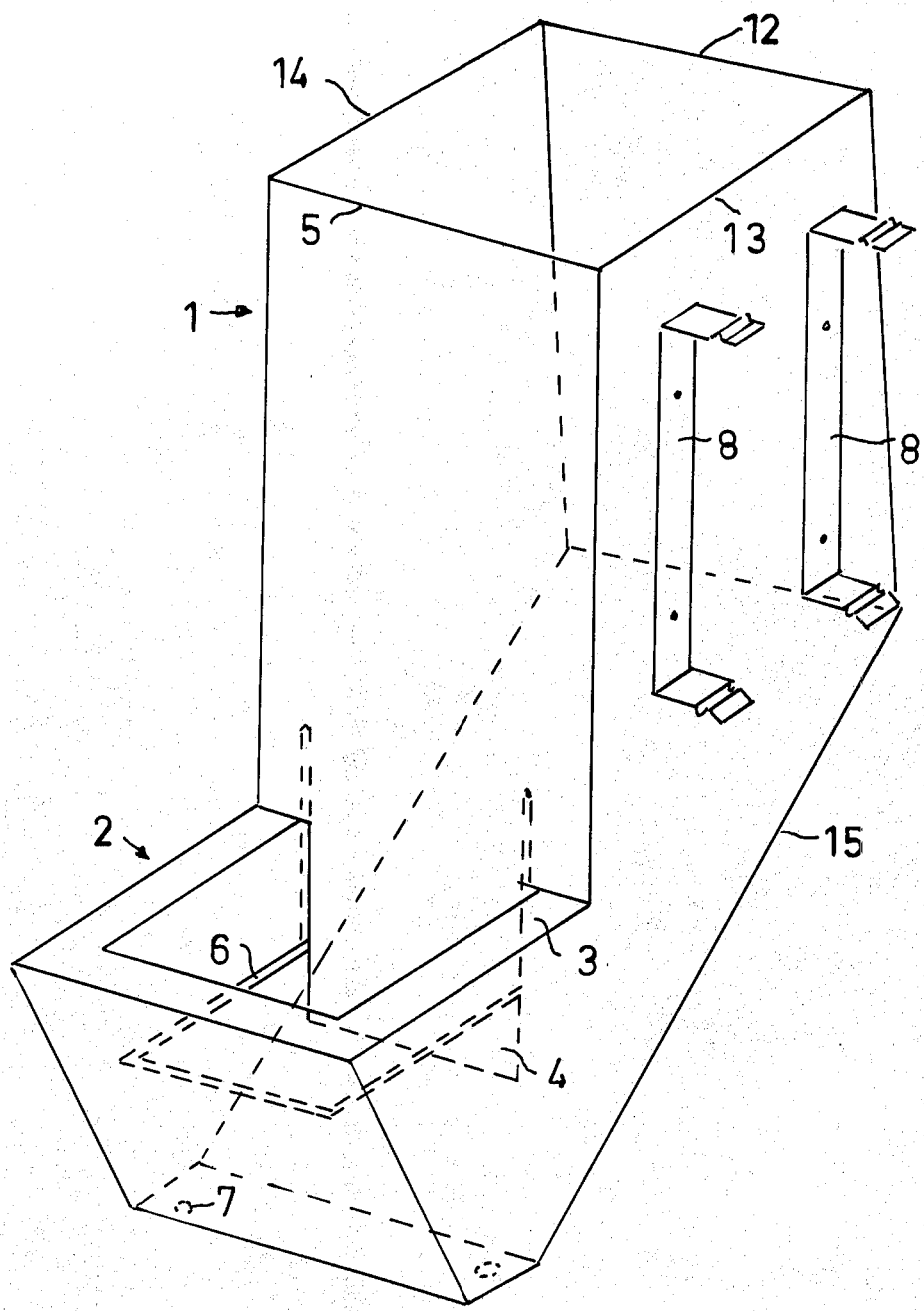
FIG. 4 shows a perspective view of the device.

1 denotes a container having substantially a square cross-section. The container 1 is upwardly tapering in order to provide for a suitable release of a feed stuff introduced into the container. With reference to the use in mink cages the container as well as other parts are made out of sheet-metal, whereby the parts have suitably been galvanized. The container 1 comprises four side walls 5, 12, 13, and 14 and a bottom surface 15, which is arranged at an angle to the side wall 12, the rear side wall. Hereby the angle between the side wall and the bottom surface is so chosen that the angle of repose of the feed stuff introduced into the container 1 is exceeded and the feed stuff can fall down along the bottom surface 15. From the lower part of the container 1 a bowl shaped distribution part 2 extends, which is upwardly open. The bowl shaped part 2 is thereby provided with broad edges 3. These edges 3 have a width which is suitably not below 15 mm. On the other hand the edges 3 shall not be made so broad in relation to the opening that the mink has difficulties in reaching down into the bowl shaped part 2 without causing fur damages. The width of the edges 3 are also dependent on the depth down to the feed stuff surface and are thereby invertedly proportional to this depth, i.e. the larger depth the narrower edges can be used. At a feed stuff depth of about 40 mm the edge width is about 15 mm, at 60 mm the width is about 10 mm and at 30 mm the width is about 20 mm.

As a restriction between the container part 1 and the bowl shaped part 2 a tongue 4 extends downwardly.

The tongue 4 is suitably an extension of one wall 5 of the container 1. The tongue 4 serves to determine the height of feed stuff in the bowl shaped part when the feed stuff flows forward from the container 1, and also to prevent escaping via the container 1 in case this is placed outside the cage.

In the bowl shaped part 2 a bow 6 is further arranged in such a way that a plane through all sides of the bow 6 is substantially parallel to a surface of a feed stuff flowing forward from the container 1 into the bowl shaped part 2, and so arranged that the plane is present in or at some distance (10–20 mm) above the feed stuff surface. The bow 6 is made out of a hardened metal wire having a diameter of 4 mm. In the present embodiment the bow 6 is made of a L-bowed, U-shaped wire material, whereby it is attached on the inside of the container 1. The bow 6 can also be manufactured as an open square or rectangle and then be attached to the front inside of the bowl shaped part 2 or the respective sides of the tongue 4. The vertically projected surface of the bow substantially corresponds to the surface of the bowl opening.

In the bottom of the bowl shaped part 2 some minor holes 7 are arranged intended for drawing any water in case of rain, or water in some other way is coming down into the container 1 or the bowl shaped part 2.

The feeding device is attached on the inside of the cage by means of two prebowed holders 8 made out of a flexible iron quality. As the cage net is standardized the holders 8 can be premanufactured and be fixedly attached on the outside of the container. The holders 8 can be arranged for left, right or rear side hanging, whereby they can be welded or screwed onto the container. In the latter case the assemblence of the holders 8 can be easily changed depending on the need.

Suitably a hopper 9 belongs to the feed stuff device comprising an upwardly widening, throughout open part 10 and holding means 11 intended to be fixed to the mink cage net. The hopper 9 can be made of plastics material as the mink can not reach it, but can as well be made of galvanized sheet-metal. In order to prevent rain or snow to fall down into the container the hopper can be provided with a lid. The hopper 9 can also, as shown, be made sloped in order to simplify mechanical filling. The opening of the hopper 9 facing the container 1 is preferably smaller than the opening of the container 1 in order to prevent spill of feed stuff. The feeding device is preferably arranged in the cage directly under its roof lid, whereby the hopper 9 is arranged on the lid so that it accompanies the lid when this is opened. Thereby maximal acquisition of the feeding device is obtained. In the drawings a cage net has been shown with its wire 16.

The container above has been shown having a square cross section. It is of course so that the container can be made with any other cross-section area, as rectangular, circle round, or oval. The height of the container is neither critical but can be adopted to the circumstances. The volume of the container should, however, not be less than the volume of the daily ration of feed stuff for that or those minks living in the cage in which the feeding device is inserted.

I claim:

1. In an animal feeding device comprising:
   a feed container having a front;
   a bowl shaped feeding part connected to the front of said feed container, being adapted to receive feed from said container and present it to an animal to be fed, said bowl having an internal surface wherein said feed accumulates and an upper edge defines an opening through which the animal has access to said feeder;
   a tongue extending downwardly from the front of said container and separating said container and said feeding part creating an underflow passage through which feed is dispensed from said container to said bowl shaped feeding part and regulates the position of the upper surface of feed within said bowl relative to said edges;
   the improvement wherein said feeding device further has a bow means which lies within and substantially conforms with the interior surface of said bowl shaped feeding part, said bow being attached to at least one of said bowl and said tongue and being of a size and location close to the interior surface of said bowl shaped feeding part and in or at some distance above the surface of the feed stuff effective to prevent the animal being fed from removing food from said bowl by pawing it up the sides of the internal surface of the bowl.

2. A feeding device according to claim 1, characterized in that the bow (8) seen from above covers substantially the same surface as the free opening of the bowl shaped part (2).

3. In a feeding device according to claim 1, wherein the upper edges of the feeding part have a horizontal width which is inversely proportional to the depth of the feed stuff surface below said edges.

4. A feeding device according to claim 3, characterized in that the width of the edge is 15 mm at a depth to the feed stuff surface of 40 mm.

* * * * *

UNITED STATES PATENT AND TRADEMARK OFFICE
CERTIFICATE OF CORRECTION

PATENT NO. : 4,432,304
DATED : February 21, 1984
INVENTOR(S) : Johnsson

It is certified that error appears in the above—identified patent and that said Letters Patent is hereby corrected as shown below:

Column 4, line 32, "bow (8)" should read --bow (6)--.

Signed and Sealed this

Twelfth Day of June 1984

[SEAL]

Attest:

GERALD J. MOSSINGHOFF

Attesting Officer

Commissioner of Patents and Trademarks